US009525274B2

(12) United States Patent
Burrows et al.

(10) Patent No.: US 9,525,274 B2
(45) Date of Patent: Dec. 20, 2016

(54) DISTRIBUTION OF CORONA IGNITER POWER SIGNAL

(71) Applicant: Federal-Mogul Ignition Company, Southfield, MI (US)

(72) Inventors: John Antony Burrows, Timperly (GB); Zdenek Svimbersky, Northville, MI (US); Robert Emil Ratz, Superior Township, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 204 days.

(21) Appl. No.: 14/307,796

(22) Filed: Jun. 18, 2014

(65) Prior Publication Data

US 2015/0311680 A1 Oct. 29, 2015

Related U.S. Application Data

(60) Provisional application No. 61/985,709, filed on Apr. 29, 2014.

(51) Int. Cl.
*F02P 15/00* (2006.01)
*F02P 7/00* (2006.01)
(Continued)

(52) U.S. Cl.
CPC ................. *H01T 19/00* (2013.01); *F02P 7/03* (2013.01); *F02P 23/04* (2013.01); *F02P 15/08* (2013.01); *H01T 13/44* (2013.01)

(58) Field of Classification Search
CPC .............. H01T 19/00; F02P 7/03; F02P 7/035; F02P 23/04; F02P 15/10
(Continued)

(56) References Cited

U.S. PATENT DOCUMENTS 3,710,763 A * 1/1973 Bassot .................... F02D 41/30 123/447
3,934,566 A 1/1976 Ward
(Continued)

FOREIGN PATENT DOCUMENTS

WO 9100961 A1 1/1991
WO 9222745 A1 12/1992
WO 2004063560 A1 7/2004

OTHER PUBLICATIONS

International Search Report mailed Aug. 4, 2015.
(Continued)

*Primary Examiner* — Stephen K Cronin
*Assistant Examiner* — Gonzalo Laguarda
(74) *Attorney, Agent, or Firm* — Robert L. Stearns; Dickinson Wright, PLLC

(57) ABSTRACT

A corona discharge ignition system comprising a plurality of corona igniters is provided. The system includes a control and drive electronics unit for directing the energy from a power supply toward the corona igniters; and a single transformer disposed between the control and drive electronics unit and the plurality of corona igniters. A plurality of igniter switching units is connected to the control and drive electronics unit and each igniter switching unit is connected to a separate one of the corona igniters. Each igniter switching unit allows current to travel from the transformer to the one connected corona igniter when activated and prevents current from traveling from the transformer to the one connected corona igniter and from the one connected corona igniter toward the transformer when deactivated. Only one of the igniter switching units is activated at any given time during operation of the system.

20 Claims, 3 Drawing Sheets

(51) Int. Cl.

| | |
|---|---|
| ***H01T 19/00*** | (2006.01) |
| ***F02P 7/03*** | (2006.01) |
| ***F02P 23/04*** | (2006.01) |
| *F02P 15/08* | (2006.01) |
| *H01T 13/44* | (2006.01) |

(58) Field of Classification Search
USPC .............................................. 123/143 B, 643
See application file for complete search history.

(56) References Cited

U.S. PATENT DOCUMENTS

| | | | | |
|---|---|---|---|---|
| 4,191,912 A | | 3/1980 | Gerry | |
| 4,206,613 A | * | 6/1980 | Shockley | B60H 1/3208 123/198 R |
| 4,209,843 A | * | 6/1980 | Hyatt | B60R 16/0373 708/422 |
| 4,428,349 A | | 1/1984 | Snow | |
| 4,509,495 A | * | 4/1985 | Betz | F02P 3/02 123/621 |
| 4,556,040 A | * | 12/1985 | Heyke | F02P 7/035 123/643 |
| 5,125,387 A | * | 6/1992 | De Wit | F02P 15/10 123/146.5 A |
| 5,655,210 A | | 8/1997 | Gregoire et al. | |
| 8,547,020 B2 | | 10/2013 | Barroso et al. | |
| 8,646,429 B2 | | 2/2014 | Agneray et al. | |
| 2004/0129241 A1 | * | 7/2004 | Freen | F02C 7/266 123/143 B |
| 2009/0314239 A1 | * | 12/2009 | Idogawa | F02P 23/045 123/169 R |
| 2012/0055456 A1 | * | 3/2012 | Mueller | F02P 23/04 123/608 |
| 2013/0068204 A1 | * | 3/2013 | Trecarichi | F02P 3/0435 123/594 |

OTHER PUBLICATIONS

Steffen Bonne: "Hochfrequenz-Zundsystem mittels Korona-Entladung", MTZ—Motortechnische Zeitschrift—Ausgabe Jan. 2014, vol. Jan. 2014, Jan. 31, 2014.

International Search Report, mailed Oct. 28, 2015 (PCT/US2015/024491).

* cited by examiner

DISTRIBUTION OF CORONA IGNITER POWER SIGNAL

CROSS REFERENCE TO RELATED APPLICATION

This application claims the benefit of U.S. Provisional Patent Application Ser. No. 61/985,709 filed Apr. 29, 2014, which is hereby incorporated by reference in its entirety.

BACKGROUND OF THE INVENTION

1. Field of the Invention

This invention relates generally to a corona discharge ignition system, and more particularly to a system and method for supplying energy to a plurality of corona igniters of the corona discharge ignition system.

2. Related Art

Corona discharge ignition systems provide an alternating voltage and current, reversing high and low potential electrodes in rapid succession which enhances the formation of corona discharge and minimizes the opportunity for arc formation. The system typically includes a transformer receiving energy from a power supply in the form of a direct current, amplifying the voltage, and reducing the current prior to directing the energy in the form of an alternating current toward a central electrode of the corona igniter. The central electrode is charged to a high radio frequency voltage potential and creates a strong radio frequency electric field in a combustion chamber. The electric field causes a portion of a mixture of fuel and air in the combustion chamber to ionize and begin dielectric breakdown, facilitating combustion of the fuel-air mixture, which is referred to as an ignition event. The electric field is preferably controlled so that the fuel-air mixture maintains dielectric properties and corona discharge occurs, also referred to as non-thermal plasma. The ionized portion of the fuel-air mixture forms a flame front which then becomes self-sustaining and combusts the remaining portion of the fuel-air mixture. Preferably, the electric field is controlled so that the fuel-air mixture does not lose all dielectric properties, which would create thermal plasma and an electric arc between the electrode and grounded cylinder walls, piston, metal shell, or other portion of the igniter. An example of a corona discharge ignition system is disclosed in U.S. Pat. No. 6,883,507 to Freen.

Oftentimes, the corona discharge ignition system includes a plurality of corona igniters, such as one in each cylinder of the engine. Thus, the system also includes a plurality of energy transformers each ultimately connected to one of the corona igniters. However, use of this design is limited as each transformer is expensive and increases the size and complexity of the corona discharge ignition system.

SUMMARY OF THE INVENTION

One aspect of the invention provides a corona discharge ignition system comprising a plurality of corona igniters for receiving energy and emitting an alternating electrical field to provide a corona discharge. The system also includes a control and drive electronics unit, a single transformer, a control and drive electronics unit for directing the energy from a power supply toward the corona igniters, a plurality of isolated switch controls, and a plurality of igniter switching units. The transformer is disposed between the control and drive electronics unit and the plurality of corona igniters for receiving the energy from the control and drive electronics unit and increasing the voltage of the energy before directing the energy from the control and drive electronics unit toward the corona igniters. Each isolated switch control is connected to the control and drive electronics unit and is also connected to a separate one of the corona igniters for receiving a control signal from the control and drive electronics unit and allowing the energy from the transformer to travel to the one connected corona igniter in response to the control signal. Each igniter switching unit is connected to the transformer and each is disposed between and connected to one of the isolated switch controls and the one connected corona igniter. Each igniter switching unit is activated and deactivated by the connected isolated switch control in response to the control signal to allow current to travel from the transformer to the one connected corona igniter when the igniter switching unit is activated and to prevent current from traveling from the transformer to the one connected corona igniter and from the one connected corona igniter toward the transformer when the igniter switching unit is deactivated. In addition, only one of the igniter switching units is activated at any given time during operation of the system.

According to another embodiment, the system includes a plurality of electromechanical relays each connected to the control and drive electronics unit, the transformer, and to a separate one of the corona igniters for receiving the control signal from the control and drive electronics unit and for allowing the energy from the transformer to travel to the one connected corona igniter in response to the control signal. Each of the electromechanical relays includes the igniter switching unit, which is activated and deactivated in response to the control signal to allow the energy to travel from the transformer to the one connected corona igniter when the igniter switching unit is activated and to prevent the energy from traveling from the transformer to the one connected corona igniter and from the one connected corona igniter toward the transformer when the igniter switching unit is deactivated.

Another aspect of the invention provides a method for operating a corona discharge ignition system. The method includes providing energy from a power supply to a control and drive electronics unit; and transferring the energy from the control and drive electronics unit toward a plurality of corona igniters. Before transferring the energy from the control and drive electronics unit toward the corona igniters, the method includes increasing the voltage. A plurality of igniter switching units each connected to a transformer and to a separate one of the corona igniters is provided, and the method further includes activating the igniter switching units to convey the energy from the transformer through the igniter switching units to the plurality of corona igniters and deactivating the igniter switching units to prevent the energy from traveling to and from the connected corona igniters. The step of activating the igniter switching units includes activating only one of the igniter switching units and conveying current to only one of the corona igniters at any given time during operation of the system.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
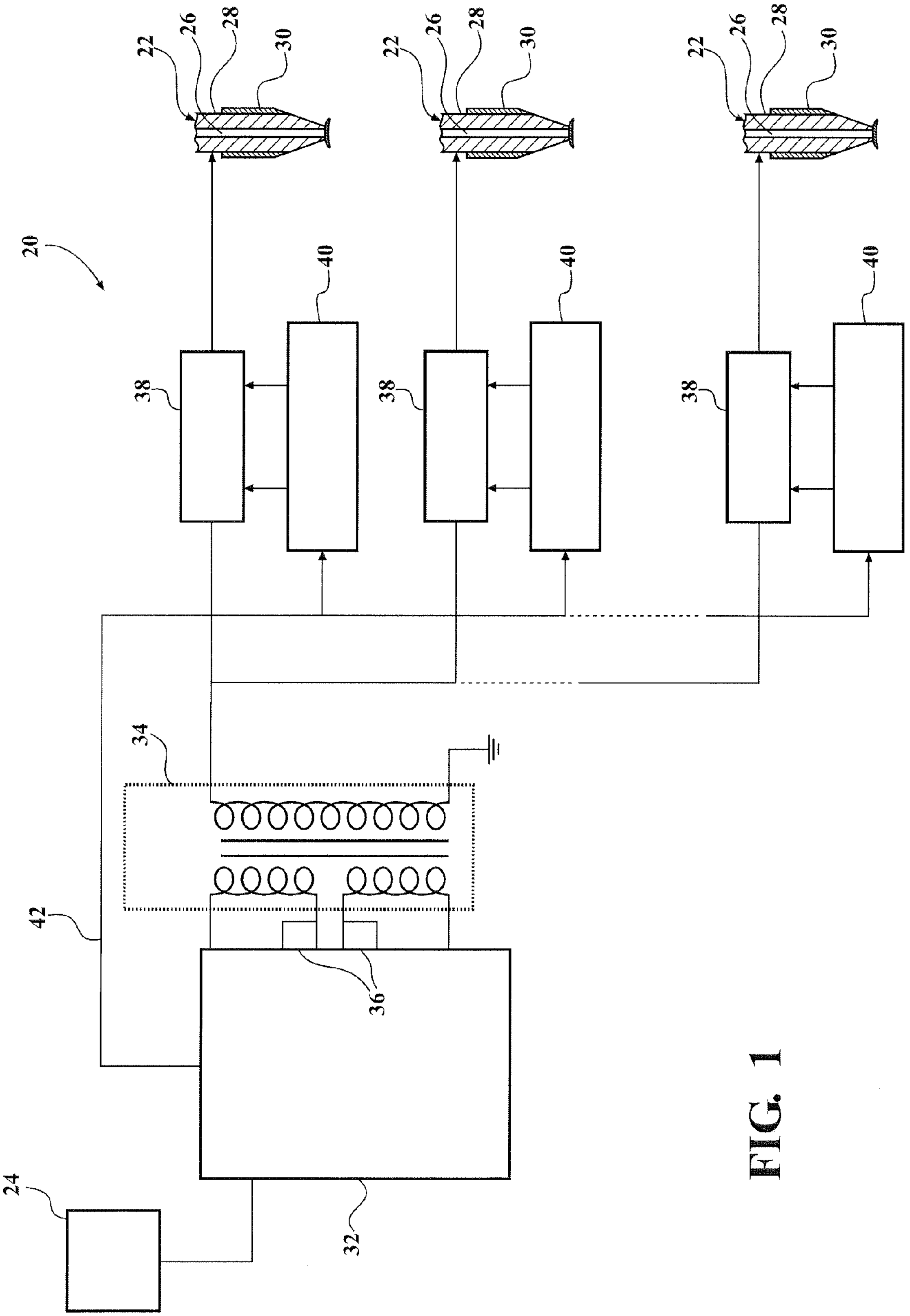
FIG. 1 is a diagram of a corona discharge ignition system according to an exemplary embodiment of the invention.
Figure 2:
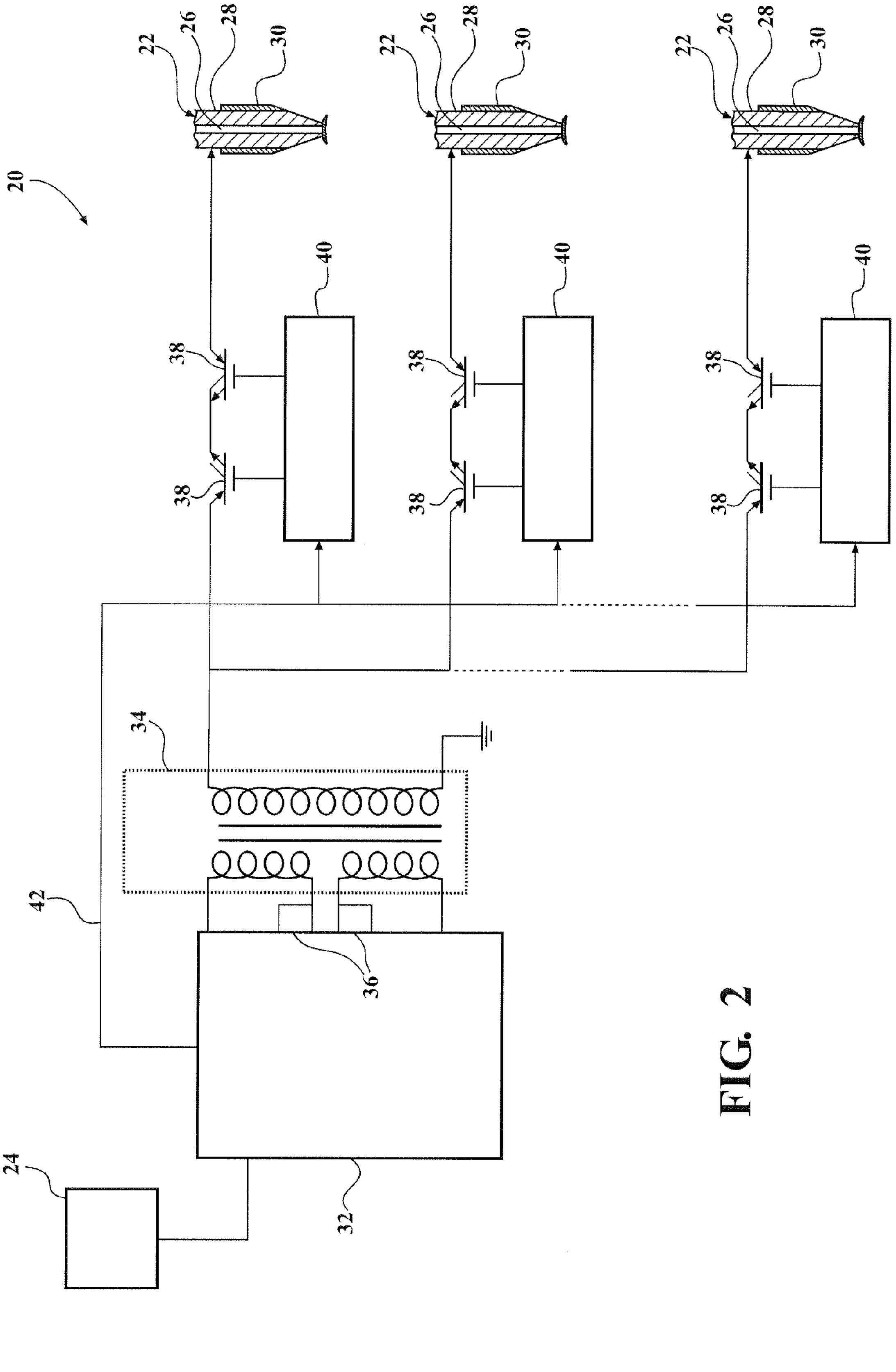
FIG. 2 is a diagram of the corona discharge ignition system according to a second exemplary embodiment of the invention.
Figure 3:
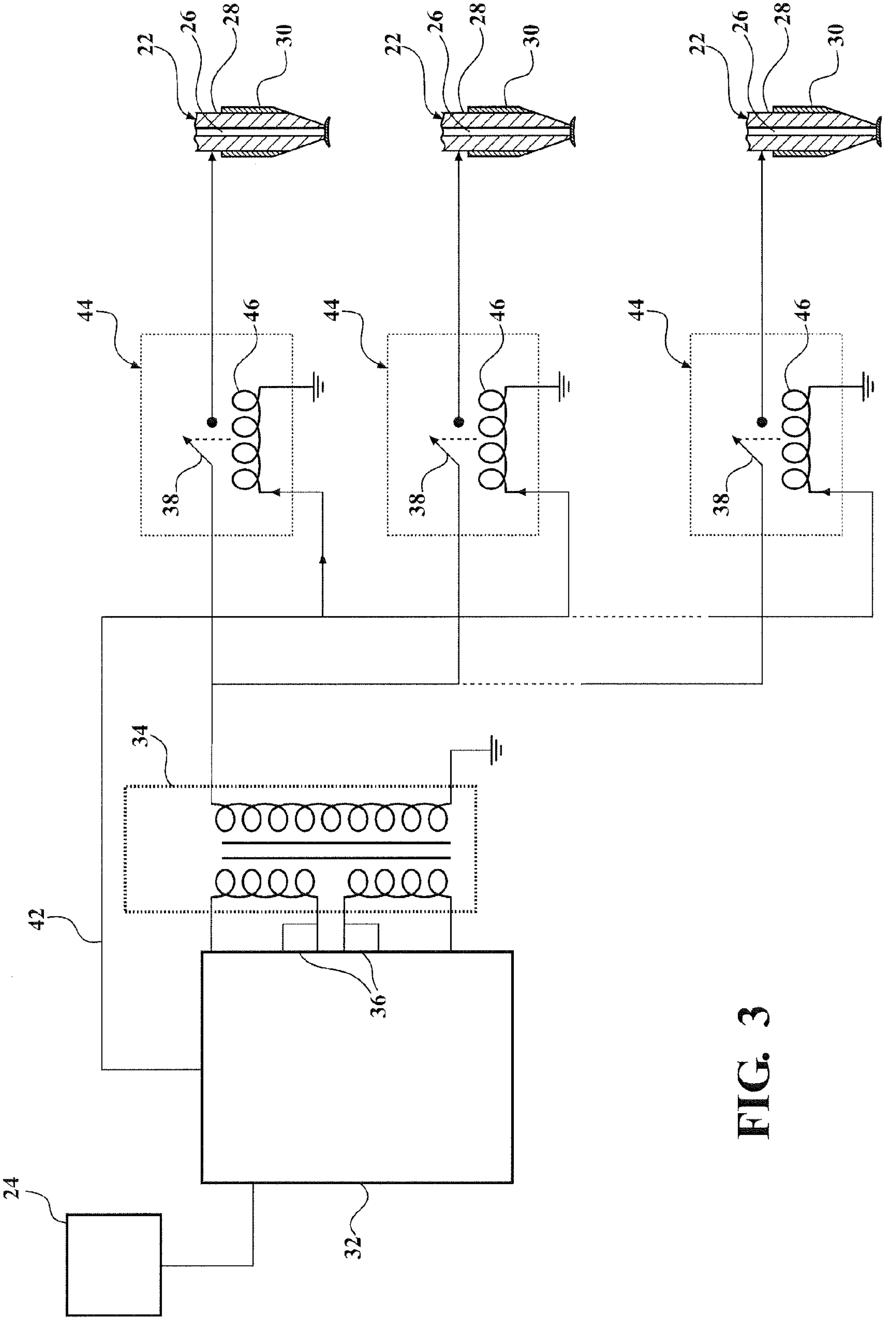
FIG. 3 is a diagram of the corona discharge ignition system according to a third exemplary embodiment of the invention.

One aspect of the invention provides a corona discharge ignition system 20 comprising a plurality of corona igniters 22 with reduced costs and complexity. FIGS. 1-3 illustrate exemplary embodiments of the system 20. Each of the corona igniters 22 receives energy from a power supply 24 and oscillates at a resonant frequency, thereby providing a high voltage alternating electric field capable of providing a corona discharge. Each of the corona igniters 22 includes an electrode 26 for receiving the energy and emitting the alternating electrical field to provide the corona discharge. An insulator 28 surrounds the electrode 26, and a metal shell 30 typically surrounds the insulator 28. Any type of corona igniter 22 can be used in the system 20 of the present invention.

The system 20 includes a control and drive electronics unit 32 for receiving the energy from the power supply 24 and directing the energy toward the corona igniters 22. A single transformer 34 is disposed between the control and drive electronics unit 32 and the corona igniters 22 for receiving the energy from the control and drive electronics unit 32 and directing the energy from the control and drive electronics unit 32 toward the corona igniters 22. The transformer 34 receives the energy in the form of a switched direct current, amplifies the voltage typically up to 2.5 kilovolts (peak to peak), and reduces the current of the energy prior to directing the energy in the form of an alternating current toward the corona igniters 22. The control and drive electronics unit 32 includes all equipment required to provide the single transformer 34 with a sufficient power supply 24 at the correct frequency. This single transformer 34 is the only transformer 34 in the system 20, unlike comparative systems which include a transformer for each corona igniter, which significantly increases the cost and complexity of the system. In the system 20 of the present invention, the high speed components used to provide power to the transformer 34 are not duplicated, as in comparative systems 20.

A transformer switching unit 36 is disposed between and connected to the control and drive electronics unit 32 and the transformer 34. The transformer switching unit 36 allows the energy to travel from the control and drive electronics unit 32 to the transformer 34 when the transformer switching unit 36 is activated by the control and drive electronics unit 32. The transformer switching unit 36 also prevents the energy from traveling from the control and drive electronics unit 32 to the transformer 34 when the transformer switching unit 36 is deactivated by the control and drive electronics unit 32. In the exemplary embodiment of FIG. 2, the transformer switching unit 36 includes a pair of transistors. Only one transistor of the transformer switching unit 36 is on while the corona discharge is being provided to allow current to flow to the igniters 22, and neither transistor is on when corona discharge is not being provided in order to prevent current from flowing to the igniters 22. Also, each transistor of the transformer switching unit 36 is activated once every half cycle corresponding to the resonant frequency of the corona igniter 22 to provide the current to the transformer 34 at times causing the corona igniters 22 to oscillate at their resonant frequency. For example, each transistor of the transformer switching unit 36 can be activated a plurality of times per second and deactivated the remainder of each second during operation of the system 20.

The system 20 also includes plurality of isolated switch controls 40 each connected to the control and drive electronics unit 32. Each of the isolated switch controls 40 is also connected to a separate one of the corona igniters 22. Thus, the number of isolated switch controls 40 equals the number of corona igniters 22. The isolated switch control 40 receives a control signal 42 from the control and drive electronics unit 32 and allows the energy from the transformer 34 to travel to the one connected corona igniter 22 in response to the control signal 42. The control and drive electronics unit 32 transmits the control signal 42 to only one of the isolated switch controls 40 at any given time during operation of the system 20.

A plurality of igniter switching units 38 each disposed between and connected to one of the isolated switch controls 40 and the one connected corona igniter 22 is also provided in the system 20. Thus, the number of the igniter switching units 38 is proportional to the number of the corona igniters 22. Each of the igniter switching units 38 is connected to the single transformer 34 for allowing current to travel from the single transformer 34 to the one connected corona igniter 22 when the associated igniter switching unit 38 is activated. The igniter switching unit 38 is activated and deactivated by the connected isolated switch control 40 in response to the control signal 42. The igniter switching unit 38 is also capable of preventing current from traveling from the transformer 34 to the connected corona igniter 22 and from the one connected corona igniter 22 toward the transformer 34 when the igniter switching unit 38 is deactivated. This feature is referred to as bidirectional blocking. The igniter switching unit 38 is activated a plurality of times per second, but fewer times per second than the transistors of the transformer switching unit 36 and is deactivated the remainder of each second during operation of the system 20.

Only one of the igniter switching units 38 is activated at any given time during operation of the system 20 in order to selectively enable only one corona igniter 22 at any given time during operation of the system 20. The igniter switching unit 38 needs to only operate at the speed of engine rotation (typically tens of Hz) and only needs to switch once during each period of many milliseconds. This allows for a slower, cheaper, and less complicated circuit in the isolated switch control 40, along with slower and cheaper igniter switching unit 38.

The system 20 of the present invention is preferably designed to avoid parasitic losses caused by connecting multiple igniter switching units 38 to the output of the single transformer 34. For example, parasitic losses can be reduced by careful design of the PCB and the isolated switch controls 40, such as locating the isolated switch controls 40 close to the transformer 34.

At least one of the igniter switching units 38 includes a pair of transistors. In this case, the isolated switch control 40 isolates the transistors from the control signal 42. One of the transistors prevents current from traveling from the transformer 34 to the one connected corona igniter 22 and the other one of the transistors prevents current from traveling from the one connected corona igniter 22 toward the transformer 34 when the igniter switching unit 38 is deactivated. Alternatively, at least one of the igniter switching units 38 includes a triode for alternating current (TRIAC). The TRIAC also prevents the current from traveling from the transformer 34 to the one connected corona igniter 22 and prevents the current from traveling from the one connected corona igniter 22 toward the transformer 34 when the igniter switching unit 38 is deactivated. Another alternative is to use a gallium nitride (GaN) transistor for at least one of the igniter switching units 38.

Another exemplary embodiment of the corona discharge ignition system 20 is shown in FIG. 3. In this case, the system 20 includes plurality of electromechanical relays 44 each connected to the control and drive electronics unit 32, the transformer 34, and to a separate one of the corona igniters 22 for receiving the control signal 42 from the control and drive electronics unit 32 and for allowing the current from the transformer 34 to travel to the one connected corona igniter 22 in response to the control signal 42. Each of the electromechanical relays 44 includes the igniter switching unit 38, which is activated and deactivated in response to the control signal 42 to allow the current to travel from the transformer 34 to the one connected corona igniter 22 when the igniter switching unit 38 is activated and to prevent the current from traveling from the transformer 34 to the one connected corona igniter 22 and from the one connected corona igniter 22 toward the transformer 34 when the igniter switching unit 38 is deactivated. As in the embodiment of FIG. 1, only one of the igniter switching units 38 is activated at any given time. The electromechanical relay 44 needs only to operate on the timescale of ignition events, not on the timescale of individual cycles of the corona-generating transformer 34 or amplifier.

As shown in FIG. 3, each of the electromechanical relays 44 includes a coil 46 which is electrically isolated from the igniter switching unit 38. The coil 46 receives the control signal 42 and activates the igniter switching unit 38 in response to the control signal 42. No current travels through the electromechanical relays 44 to or from the connected corona igniter 22 when the igniter switching unit 38 of the electromechanical relay 44 is switching on to become activated or switching off to become deactivated.

One advantage of the system 20 of FIG. 3 is the inherent isolation of the electromechanical relays 44 which makes the igniter switching unit 38 easy to drive with low-cost electronics. The electromechanical relay 44 also provides bidirectional blocking of the current and exceptionally high resistance when not connecting the corona igniter 22 to the transformer 34, which leads to low parasitic losses. It is also possible to use an electromechanical device, such as reed-relay type device, because it can be arranged that the supply to the corona igniters 22 from the control and drive electronics unit 32 is always disabled when the relays are switching. Switching with no current flowing greatly extends the life of the electromechanical relays 44. Suitable devices are available which are capable of switching in about one millisecond; withstanding moderate voltages, such as up to at least 2000 volts; operating at the temperatures required, such as up to 150° C.; carrying the current required, such as up to about 10 A; and having a suitable lifetime, such as up to 300 million operations.

Another aspect of the invention provides a method for operating a corona discharge ignition system 20. The method includes providing energy from the power supply 24 to the control and drive electronics unit 32, and transferring the energy from the control and drive electronics unit 32 toward the plurality of corona igniters 22. The method further includes increasing the voltage of the energy before transferring the energy from the control and drive electronics unit 32 toward the plurality of corona igniters 22.

The method then includes activating the igniter switching units 38 to convey the current from the transformer 34 through the igniter switching units 38 to the plurality of corona igniters 22 and deactivating the igniter switching units 38 to prevent the current from traveling to and from the connected corona igniters 22. The step of activating the igniter switching units 38 includes activating only one of the igniter switching units 38 and conveying current to only one of the corona igniters 22 at any given time during operation of the system 20.

The step of activating only one of the igniter switching units 38 is in response to a control signal 42 from the control and drive electronics unit 32. In addition, the step of activating the igniter switching units 38 includes activating each of the igniter switching units 38 a plurality of times per second, and the step of deactivating the igniter switching units 38 includes deactivating each igniter switching units 38 for the remainder of each second during operation of the system 20.

The method typically includes providing the energy from the control and drive electronics unit 32 to the transformer 34 for increasing the voltage of the energy before transferring the energy from the control drive and electronics unit toward the plurality of corona igniters 22. The transformer switching unit 36 allows current to travel from the control and drive electronics unit 32 to the transformer 34 when one of the transistors of the transformer switching unit 36 is activated by the control and drive electronics unit 32 and prevents the current from traveling from the control and drive electronics unit 32 to the transformer 34 when the transistors of the transformer switching unit 36 are deactivated by the control and drive electronics unit 32. The method also includes activating each of the transistors of the transformer switching unit 36 a plurality of times per second, and more times per second than the igniter switching units 38. The method also includes deactivating the transistors of the transformer switching unit 36 the remainder of each second during operation of the system 20.

Obviously, many modifications and variations of the present invention are possible in light of the above teachings and may be practiced otherwise than as specifically described while within the scope of the appended claims.

What is claimed is:

1. A corona discharge ignition system, comprising: a plurality of corona igniters; a control and drive electronics that directs energy from a power supply toward said corona igniters; a transformer disposed between said control and drive electronics unit and said plurality of corona igniters for receiving the energy from said control and drive electronics unit and increasing the voltage of the energy before directing an alternating current the toward said corona igniters, wherein said transformer is the only transformer in the system; a plurality of isolated switch controls each connected to said control and drive electronics unit and each connected to a separate one of said corona igniters for receiving a control signal from said control and drive electronics unit and allowing the energy from said transformer to travel to said one connected corona igniter in response to said control signal; a plurality of igniter switching units each connected to said transformer and each disposed between and connected to one of said isolated switch controls and said one connected corona igniter; each of said igniter switching units being activated and deactivated by said connected isolated switch control in response to said control signal for allowing the alternating current of the energy to travel from said transformer to said one connected corona igniter when said igniter switching unit is activated and for preventing the alternating current of the energy from traveling from said transformer to said one connected corona igniter and from said one connected corona igniter toward said transformer when said igniter switching unit is deactivated, and wherein only one of said igniter switching units is activated at any given time during operation of the system; and said one connected corona igniter receiving the alternating current of the energy from said transformer and oscillating at a resonant frequency and providing a corona discharge.

2. The corona discharge ignition system of claim 1, wherein each of said igniter switching units is activated a plurality of times per second and is deactivated the remainder of each second during operation of the system.

3. The corona discharge ignition system of claim 1, wherein the number of said isolated switch controls is equal to the number of said corona igniters, and the number of said igniter switching units is proportional to the number of said corona igniters.

4. The corona discharge ignition system of claim 1 including a transformer switching unit disposed between and connected to said control and drive electronics unit and said transformer, said transformer switching unit including a pair of transistors, only one of said transistors being activated at a time by said control and drive electronics unit for allowing current to travel from said control and drive electronics unit to said transformer, and said transformer switching unit preventing current from traveling from said control and drive electronics unit to said transformer when said transistors are deactivated by said control and drive electronics unit.

5. A corona discharge ignition system comprising: a plurality of corona igniters for receiving energy and emitting an alternating electrical field to provide a corona discharge: a control and drive electronics that directs energy from a power supply toward said corona igniters; a transformer disposed between said control and drive electronics unit and said plurality of corona igniters for receiving the energy from said control and drive electronics unit and increasing the voltage of the energy before directing the energy from said control and drive electronics unit toward said corona igniters: a plurality of isolated switch controls each connected to said control and drive electronics unit and each connected to a separate one of said corona igniters for receiving a control signal from said control and drive electronics unit and allowing the energy from said transformer to travel to said one connected corona igniter in response to said control signal: a plurality of igniter switching units each connected to said transformer and each disposed between and connected to one of said isolated switch controls and said one connected corona igniter: each of said igniter switching units being activated and deactivated by said connected isolated switch control in response to said control signal for allowing current to travel from said transformer to said one connected corona igniter when said igniter switching unit is activated and for preventing current from traveling from said transformer to said one connected corona igniter and from said one connected corona igniter toward said transformer when said igniter switching unit is deactivated, and wherein only one of said igniter switching units is activated at any given time during operation of the system a transformer switching unit disposed between and connected to said control and drive electronics unit and said transformer, said transformer switching unit including a pair of transistors, only one of said transistors being activated at a time by said control and drive electronics unit for allowing current to travel from said control and drive electronics unit to said transformer, and said transformer switching unit preventing current from traveling from said control and drive electronics unit to said transformer when said transistors are deactivated by said control and drive electronics unit; and wherein one of said transistors is activated while corona discharge is being provided, and each of said transistors is activated once every half cycle corresponding to the resonant frequency of said corona igniters to provide current to said transformer at times causing said corona igniters to oscillate at their resonant frequency.

6. The corona discharge ignition system of claim 5, wherein when said transistors are activated, said transistors are activated a plurality of times per second and more times per second than said igniter switching units and are deactivated the remainder of each second during operation of the system.

7. The corona discharge ignition system of claim 1, wherein at least one of said igniter switching units includes a pair of transistors, wherein one of said transistors is for preventing current from traveling from said transformer to said one connected corona igniter and the other one of said transistors is for preventing current from traveling from said one connected corona igniter toward said transformer.

8. The corona discharge ignition system of claim 1, wherein at least one of said igniter switching units includes a triode for alternating current (TRIAC) for preventing the current from traveling from said transformer to said one connected corona igniter and for preventing the current from traveling from said one connected corona igniter toward said transformer.

9. The corona discharge ignition system of claim 1, wherein at least one of said igniter switching units includes a gallium nitride (GaN) transistor for preventing current from traveling from said transformer to said one connected corona igniter and for preventing current from traveling from said one connected corona igniter toward said transformer.

10. A corona discharge ignition system, comprising: a plurality of corona igniters; a control and drive electronics that directs energy from a power supply toward said corona igniters; a transformer disposed between said control and drive electronics unit and said corona igniters for receiving the energy from said control and drive electronics unit and directing an alternating current of the energy toward said corona igniters, wherein said transformer is the only transformer in the system; a plurality of electromechanical relays each connected to said control and drive electronics unit and to said transformer and each connected to a separate one of said corona igniters for receiving a control signal from said control and drive electronics unit and for allowing the alternating current of the energy from said transformer to travel to said one connected corona igniter in response to the control signal;

each of said electromechanical relays including an igniter switching unit being activated and deactivated in response to the control signal for allowing the alternating current of the energy to travel from said transformer to said one connected corona igniter when said igniter switching unit is activated and preventing the alternating current of the energy from traveling from said transformer to said one connected corona igniter and from said one connected corona igniter toward said transformer when said igniter switching unit is deactivated, and wherein only one of said igniter switching units is activated at any given time: and said one connected corona igniter receiving the alternating current of the energy from said transformer and oscillating at a resonant frequency and providing a corona discharge.

11. The corona discharge ignition system of claim 10, wherein each of said electromechanical relays includes a coil electrically isolated from said igniter switching unit for receiving the control signal and activating said igniter switching unit in response to the control signal.

12. The corona discharge ignition system of claim 10, wherein no current travels through said electromechanical relays to or from said corona igniters when said igniter switching units of said electromechanical relays connected to said corona igniters are switching on to become activated or switching off to become deactivated.

13. A corona discharge ignition system, comprising: a plurality of corona igniters for receiving energy and oscillating at a resonant frequency and emitting an alternating electrical field to provide a corona discharge;

each of said corona igniters including an electrode for receiving the energy and emitting the electrical field providing the corona discharge, each of said electrodes being surrounded by an insulator, and each of said insulators being surrounded by a shell formed of metal; a power supply for providing the energy ultimately to said corona igniters; a control and drive electronics that directs energy from said power supply and directing the energy toward said corona igniters; a single transformer disposed between said control and drive electronics unit and said corona igniters for receiving the energy from said control and drive electronics unit and directing the energy from said control and drive electronics unit toward said corona igniters, wherein said single transformer is the only transformer in the system; said transformer receiving the energy in the form of a direct current and amplifying the voltage up to 2.5 kilovolts (peak to peak) and reducing the current of the energy prior to directing the energy in the form of an alternating current toward said corona igniters; a transformer switching unit including a pair of transistors disposed between and connected to said control and drive electronics unit and said transformer for allowing current to travel from said control and drive electronics unit to said transformer when one of said transistors is activated by said control and drive electronics unit and for preventing current from traveling from said control and drive electronics unit to said transformer when said transistors of said transformer switching unit is deactivated by said control and drive electronics unit; each of said transistors of said transformer switching unit being activated once every half cycle corresponding to the resonant frequency of said corona igniter to provide the current to said transformer at times causing said corona igniters to oscillate at their resonant frequency;

each of said transistors of said transformer switching unit being activated a plurality of times per second and being deactivated the remainder of each second during operation of the system; a plurality of isolated switch controls each connected to said control and drive electronics unit and each connected to a separate one of said corona igniters for receiving a control signal from said control and drive electronics unit and for allowing the energy from said transformer to travel to said one connected corona igniter in response to the control signal; the control and drive electronics unit transmitting the control signal to only one of said isolated switch controls at any given time during operation of the system; the number of isolated switch controls equaling the number of corona igniters; a plurality of igniter switching units each disposed between and connected to one of said isolated switch controls and said one connected corona igniter; each of said igniter switching units being activated and deactivated by said isolated switch controls in response to said control signal; each of said igniter switching units being connected to said single transformer for allowing the current to travel from said single transformer to said one connected corona igniter when said igniter switching unit is activated; each of said igniter switching units being capable of preventing the current from traveling from said transformer to said connected corona igniter and from said one connected corona igniter toward said transformer when said igniter switching unit is deactivated; each of said igniter switching units being activated a plurality of times per second and fewer times per second than said transistors of said transformer switching unit and being deactivated the remainder of each second during operation of the system;

the number of said igniter switching units proportional to the number of said corona igniters; and only one of said igniter switching units being activated at any given time during operation of the system.

14. The system of claim 13, wherein at least one of said igniter switching units includes a pair of transistors, said isolated switch control isolates said transistors from the control signal, and wherein one of said transistors prevents current from traveling from said transformer to said one connected corona igniter and the other one of said transistors prevents current from traveling from said one connected corona igniter toward said transformer when said igniter switching unit is deactivated.

15. The system of claim 13, wherein at least one of said igniter switching units includes a triode for alternating current (TRIAC) preventing current from traveling from said transformer to said one connected corona igniter and preventing current from traveling from said one connected corona igniter toward said transformer when said igniter switching unit is deactivated.

16. The system of claim 13, wherein at least one of said igniter switching units includes a gallium nitride (GaN) transistor preventing current from traveling from said transformer to said one connected corona igniter and preventing current from traveling from said one connected corona igniter toward said transformer when said igniter switching unit is deactivated.

17. A method for operating a corona discharge ignition system, comprising the steps of:

providing energy from a power supply to a control and drive electronics unit;

transferring the energy from the control and drive electronics unit toward a plurality of corona igniters;

increasing the voltage of the energy using a transformer before transferring the energy from the control and drive electronics unit toward the plurality of corona igniters, wherein the transformer is the only transformer in the system;

providing a plurality of igniter switching units each connected to the transformer and to a separate one of the corona igniters;

activating the igniter switching units to convey an alternating current of the energy from the transformer through the igniter switching units to the plurality of corona igniters and deactivating the igniter switching units to prevent the alternating current of the energy from traveling to and from the connected corona igniters; and the step of activating the igniter switching units including activating only one of the igniter switching units and conveying the alternating current of the energy to only one of the corona igniters at any given time during operation of the system such that the one corona igniter receives the alternating current of the energy and oscillates at a resonant frequency and provides a corona discharge.

18. The method of claim 17, wherein the step of activating only one of the igniter switching units is in response to a control signal from the control and drive electronics unit.

19. The method of claim 17, wherein the step of activating the igniter switching units includes activating each of the igniter switching units a plurality of times per second and the step of deactivating the igniter switching units includes deactivating each igniter switching units for the remainder of each second during operation of the system.

20. The method of claim 17 including the step of providing the energy from the control and drive electronics unit to the transformer for increasing the voltage of the energy before transferring the energy from the control drive and electronics unit toward the plurality of corona igniters;

providing a transformer switching unit including a pair of transistors for allowing current to travel from the control and drive electronics unit to the transformer when one of the transistors of the transformer switching unit is activated by the control and drive electronics unit and for preventing current from traveling from the control and drive electronics unit to the transformer when the transistors of the transformer switching unit are deactivated by the control and drive electronics unit; and activating the transistors of the transformer switching unit a plurality of times per second and more times per second than the igniter switching units and deactivating the transistors of the transformer switching unit the remainder of each second during operation of the system.

* * * * *